United States Patent
Jordan et al.

(10) Patent No.: US 9,663,184 B2
(45) Date of Patent: *May 30, 2017

(54) HYDRAULIC RIM BRAKE

(75) Inventors: Brian Jordan, Chicago, IL (US); Christopher Shipman, Chicago, IL (US); Neil Swanson, Colorado Springs, CO (US)

(73) Assignee: SRAM, LLC, Chicago, IL (US)

(*) Notice: Subject to any disclaimer, the term of this patent is extended or adjusted under 35 U.S.C. 154(b) by 253 days.

This patent is subject to a terminal disclaimer.

(21) Appl. No.: 13/291,797

(22) Filed: Nov. 8, 2011

(65) Prior Publication Data

US 2013/0112510 A1    May 9, 2013

(51) Int. Cl.
*B62L 3/00* (2006.01)
*B62L 1/12* (2006.01)
*B60T 1/06* (2006.01)
*F16D 65/18* (2006.01)
*F16D 121/04* (2012.01)

(52) U.S. Cl.
CPC *B62L 1/12* (2013.01); *B60T 1/06* (2013.01); *F16D 65/18* (2013.01); *F16D 2121/04* (2013.01)

(58) Field of Classification Search
CPC . B62L 1/14; B62L 3/023; B60T 7/102; B60T 11/102; B60T 7/108
USPC .. 188/24.19, 24.12, 24.22, 24.122, 344, 361
See application file for complete search history.

(56) References Cited

U.S. PATENT DOCUMENTS

| | | | |
|---|---|---|---|
| 3,338,337 A | 8/1967 | Freeland | |
| 3,554,334 A * | 1/1971 | Shimano | B62L 3/023 188/24.16 |
| 3,776,333 A * | 12/1973 | Mathauser | B62L 3/023 188/24.19 |
| 3,899,056 A * | 8/1975 | Doerr | 188/344 |
| 3,899,057 A * | 8/1975 | Carre | 188/351 |
| 4,391,353 A * | 7/1983 | Mathauser | B62L 1/10 188/24.12 |
| 4,632,225 A * | 12/1986 | Mathauser | 188/24.18 |
| 5,443,134 A * | 8/1995 | Gajek | B62L 1/14 188/2 D |
| 5,813,501 A * | 9/1998 | Terry, Sr. | 188/344 |
| 6,334,513 B1 * | 1/2002 | Chern | 188/71.7 |
| 2009/0038894 A1 * | 2/2009 | Liu | B62L 1/16 188/24.22 |

(Continued)

FOREIGN PATENT DOCUMENTS

| | | |
|---|---|---|
| FR | 868090 | 12/1941 |
| GB | 745061 | 2/1956 |
| JP | 2011143764 | 7/2011 |

OTHER PUBLICATIONS

Magura Technical Manual—1994.

*Primary Examiner* — Robert A Siconolfi
*Assistant Examiner* — Mahbubur Rashid
(74) *Attorney, Agent, or Firm* — Milan Milosevic; Lisa Serdynski

(57) ABSTRACT

A hydraulically actuated rim brake with a pair of brake arms. Both brake arms may rotate about a common axis, which is the axis of a single bolt that mounts the assembly to the bicycle. The system has one piston slidably disposed in a piston cylinder. The piston's cylinder may be formed in one of the two brake arms. Actuation of the piston in the cylinder causes movement of both brake arms.

38 Claims, 20 Drawing Sheets

(56) References Cited

U.S. PATENT DOCUMENTS

| | | | | |
|---|---|---|---|---|
| 2010/0236874 A1* | 9/2010 | Tsai | .................. | B60T 11/046 |
| | | | | 188/24.22 |
| 2011/0011683 A1* | 1/2011 | Tetsuka | .................. | B60T 1/06 |
| | | | | 188/24.19 |
| 2011/0011684 A1* | 1/2011 | Tetsuka et al. | ............ | 188/24.22 |
| 2011/0290595 A1 | 12/2011 | Nago | | |

* cited by examiner

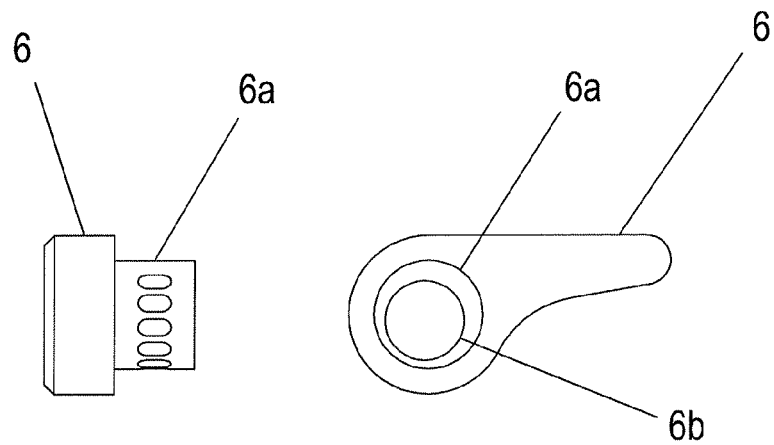
Fig. 7a    Fig. 7b
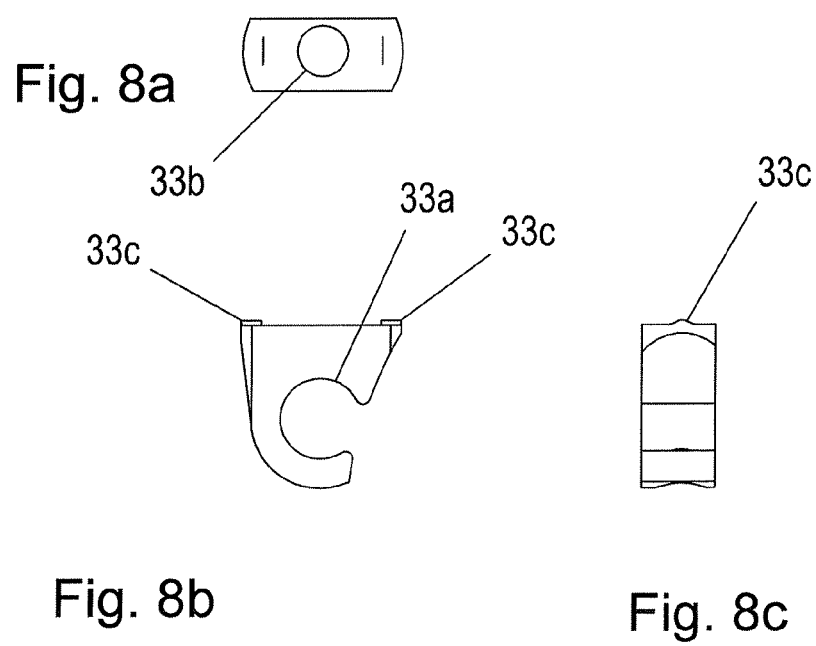
Fig. 8a
Fig. 8b    Fig. 8c

HYDRAULIC RIM BRAKE

BACKGROUND OF THE INVENTION

This invention relates to brake systems, and more particularly, to a hydraulic rim brake, preferably for a bicycle.

While there are some examples of hydraulically actuated rim brakes for bicycles, hydraulic brake systems for bicycles have been more successful when used to actuate disc brakes with calipers. Hydraulic rim brakes marketed to date tend to be complex and heavy, but have found some success in the comfort bike and urban bike market, where light weight is not a primary concern.

One reason why hydraulic rim brakes might be preferred over cable actuated brakes is the increase in braking. Power that can be generated and the numerous routing options of the hydraulic tubing.

The invention provides a bicycle with a hydraulic rim brake that is not heavy or complex and has suitable performance characteristics.

SUMMARY OF THE INVENTION

One aspect of the invention provides a hydraulic brake assembly for a bicycle the bicycle including a master cylinder operated by a brake lever, the hydraulic brake assembly including a first brake arm pivotally connected to a frame member of the bicycle. A second brake arm is configured to pivot relative to the first brake arm. One of the first and second brake arms includes a cylinder. The cylinder is non-rotatable relative to the one of the first and second brake arms. The cylinder is in fluid communication with the master cylinder and a piston is slidably disposed in the cylinder and configured such that movement of the piston in response to fluid displacement in the hydraulic brake assembly causes the first brake arm and the second brake arm to pivot.

Other aspects of the invention provide wherein the cylinder is formed in one of the first and second brake arms. A link member may be configured to be responsive to movements of the piston such that movement of the piston is conveyed by the link member to the other of the first and second brake arms. The link member may be part of the other of the first and second brake arms. The hydraulic brake may further include an adjust mechanism configured to act upon the link member to adjust the spacing between the first and second brake arms. The hydraulic brake assembly may provide a link member having a first end in contact with the piston and a second end opposite the first end in contact with the other of the first and the second brake arms the second end having a head. The adjust mechanism may include an adjust knob engaged with and displacing the link member second end to adjust the spacing between the first and second brake arms. The adjust knob may have an internal configuration shaped to engage the head of the link member. The adjust mechanism may include a spring positioned between the adjust knob and the head of the link member. The adjust mechanism may include a detent block having an first (axial) through bore through which a cylindrical boss portion of the receiver is positioned and a second (transverse) hole through which the link member is received, the detent block having one or more projections positioned and shaped to cooperate with corresponding features on the adjust knob.

The hydraulic brake assembly may include a receiver disposed in the other of the first and second brake arms wherein the link member is engaged with the receiver. The link member may be threadably engaged with the receiver. The adjust knob may cause the link member to displace the receiver through action of the threaded engagement.

The hydraulic brake assembly may further comprise a quick-release mechanism configured to act upon the link member to adjust the spacing between the first and second brake arms. The quick-release mechanism may include a quick-release lever positioned on the other of the first and second brake arms, the quick-release lever operatively displacing the link member. The receiver may be displaceable by the quick-release mechanism, the receiver being disposed in the other of the first and second brake arms wherein the link member is engaged with the receiver. The receiver may be disposed in a lever bore formed off center through the quick-release lever such that the quick-release lever imparts a cam action to the receiver when the quick-release lever is rotated.

The first brake arm and the second brake arm may share a common pivot. The hydraulic brake assembly may include a return spring positioned to bias the first brake arm and the second brake arm apart. The fluid communication between the cylinder and the master cylinder may, include a fluid passageway formed in the one of the first and second brake arms. One of the first and second brake arms may include a bleed port formed in communication with the fluid passageway to permit the release of fluid from the fluid passageway. The other of the first and second brake arms may include an upper end having a fork arrangement and wherein a combined adjust mechanism and a quick-release mechanism are disposed at the fork arrangement.

Yet another aspect of the invention provides a hydraulic brake assembly for a bicycle, the bicycle including a master cylinder operated by a brake lever, the hydraulic brake assembly including a first brake arm and a second brake arm, wherein the first and second brake arms are pivotally connected to a frame member of the bicycle on a common pivot. A cylinder is provided in communication with the master cylinder. A piston is configured such that movement of the piston in response to a change in fluid pressure in the cylinder causes the first brake arm and the second brake arm to pivot.

Other aspects of the invention provide a hydraulic brake assembly further including a cylinder formed in one of the first and second brake arms, the cylinder being in fluid communication with the master cylinder; and wherein the piston is slidably disposed in the cylinder. The hydraulic brake may further include a quick-release mechanism and an adjust mechanism configured on the other of the first and second brake arms to act between the first and second brake arms to adjust the spacing therebetween. The quick-release mechanism and the adjust mechanism may share a link member which extends between the first and second brake arms. The quick-release mechanism and the adjust mechanism may act upon the link member to adjust the spacing between the first and second brake arms. The link member may contact the piston and acts upon the piston to adjust the spacing between the first and second brake arms.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 7a and FIG. 7b are two views of a quick-release lever of the brake assembly;

FIG. 8a, FIG. 8b and FIG. 8c are three views of a detent block of the brake assembly;

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second" or "left" and "right" are used for the sake of clarity and not as terms of limitation.

Figure 4:
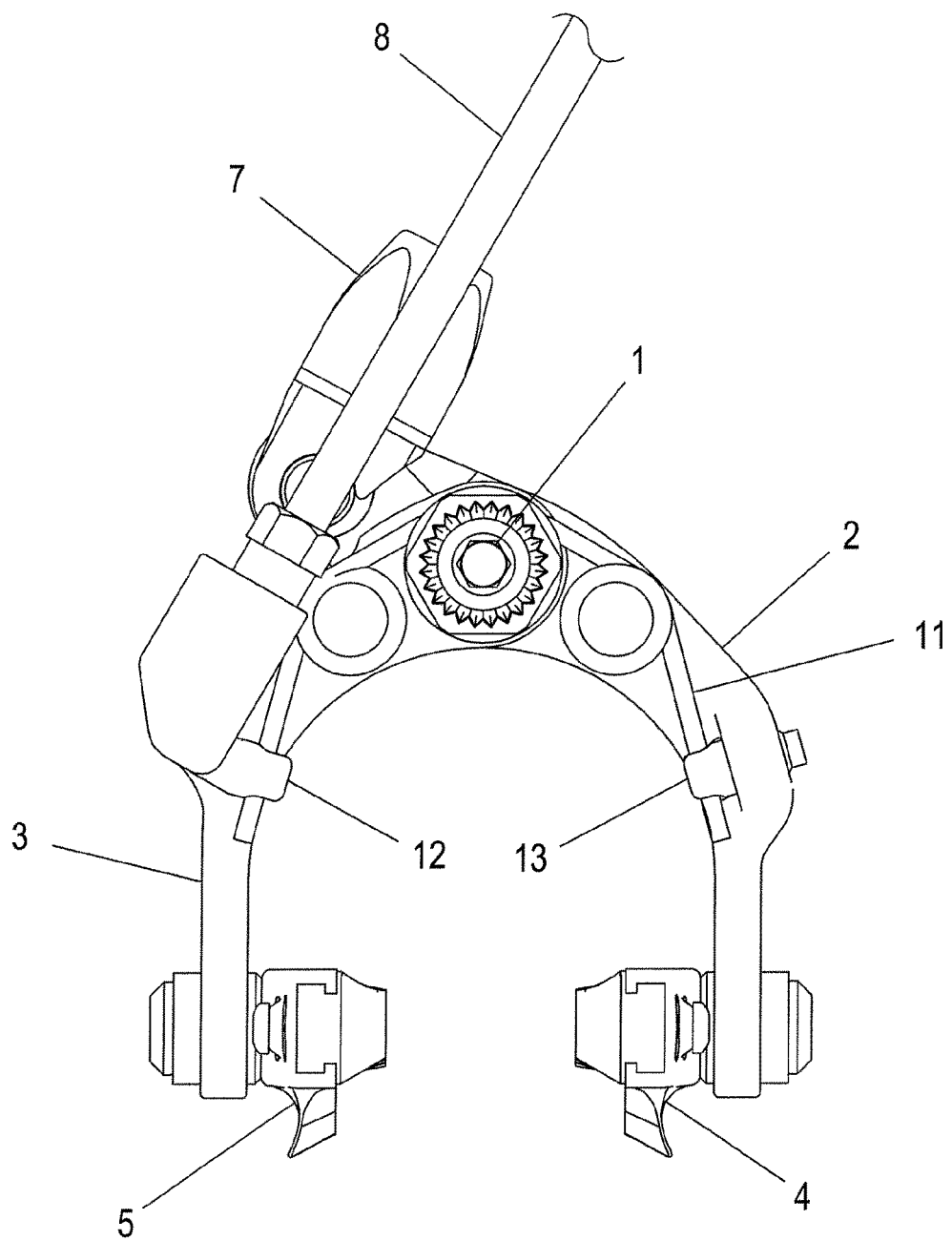
FIG. 4 is a rear view of the brake assembly of FIG. 1

Referring to FIGS. 1-4, the invention generally includes a brake assembly 50, with a first brake pad assembly 4 and a second brake pad assembly 5 secured to first brake arm 2 and second brake arm 3, respectively, in a manner that is well known in the art. A return spring 11 biases first brake pad assembly 4 and second brake pad assembly 5 apart from each other as shown in FIG. 4 by acting on the first and second brake arms 2, 3. Hydraulic fluid entering the brake assembly 50 from line 8 causes the first brake pad assembly 4 and second brake pad assembly 5 to draw together and conversely, permits the spring 11 to urge the first and second brake arms, and thus the brake pad assemblies 4, 5 apart when fluid leaves the brake assembly.

Figure 2:
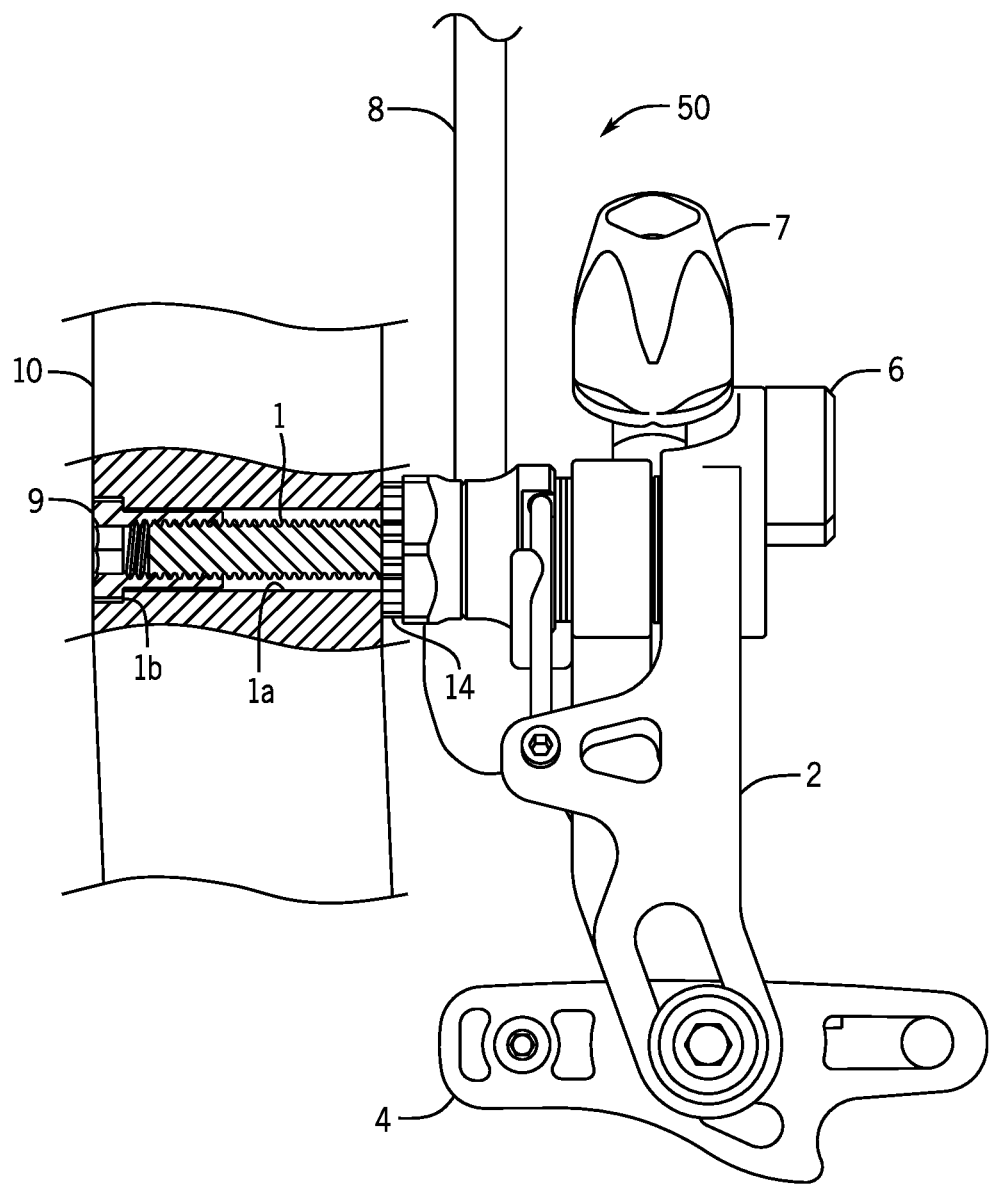
FIG. 2 is a side view of the brake assembly of FIG. 1, showing its attachment to a bicycle frame member.
Figure 3:
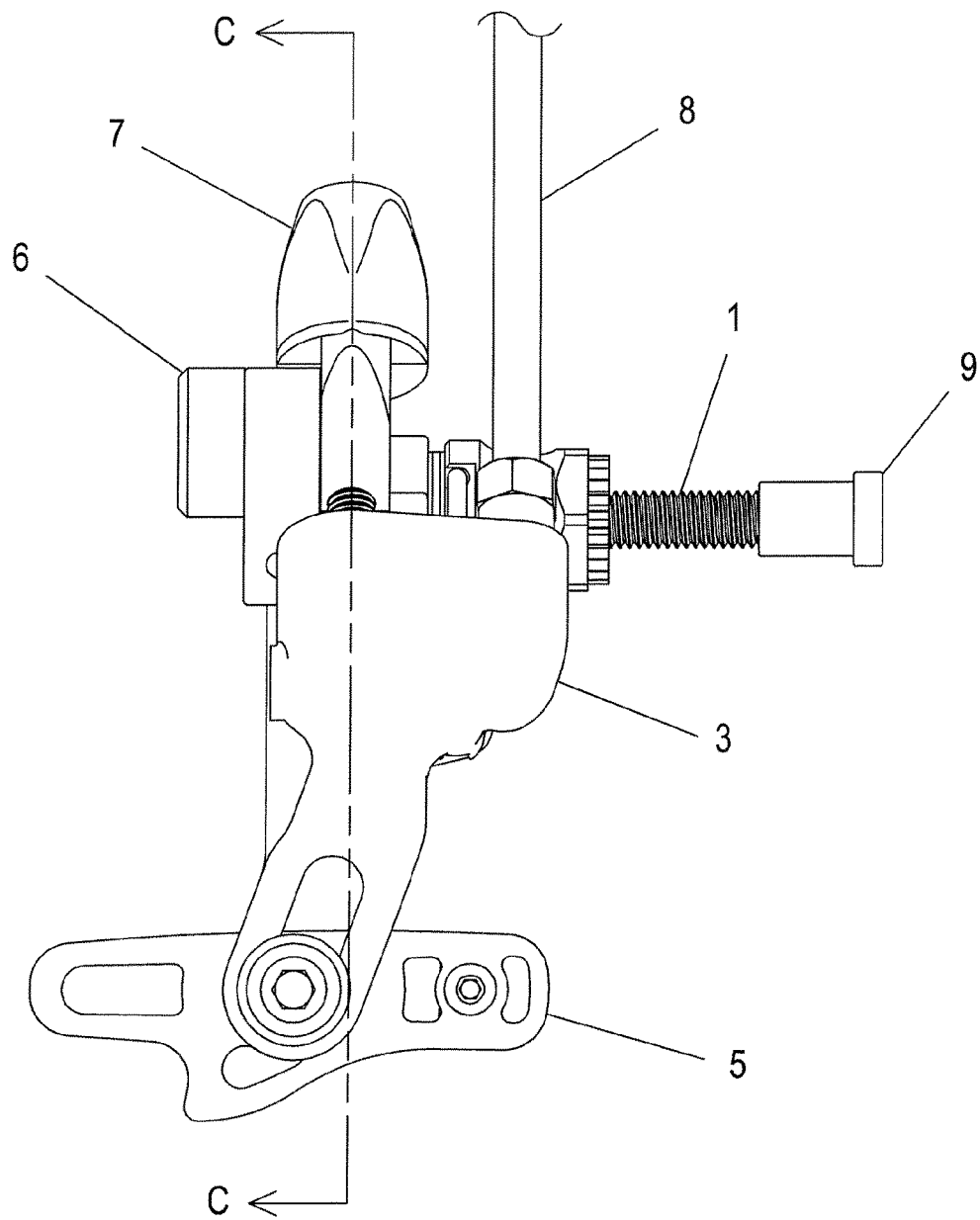
FIG. 3 is the opposite side view of the brake assembly of FIG. 2.

Referring to FIG. 2, brake assembly 50 is attachable to a bicycle frame member 10. The bicycle frame member 10 can be, for example, either a bicycle seat stay in the case of a rear brake, or a bicycle fork in the case of a front brake or an immobile part attached to the bicycle frame Pivot bolt 1 is insertable into a hole 1a in bicycle frame member 10. Mounting nut 9 is inserted into this same hole 1a from the opposite side, and threadably engages pivot bolt 1. Mounting nut 9 is tightened until the head of mounting nut 9 is fully seated in a counter bore 1b in the hole 1a in bicycle frame member 10 and serrated washer 14 is tightly pressed against the surface of bicycle frame member 10 as shown in FIG. 2. After tightening, pivot bolt 1 is non-rotatable relative to bicycle frame member 10. It will be understood that other mounting arrangements are contemplated by the invention, for example a mounting arrangement with dual or multiple pivot points.

Figure 1:
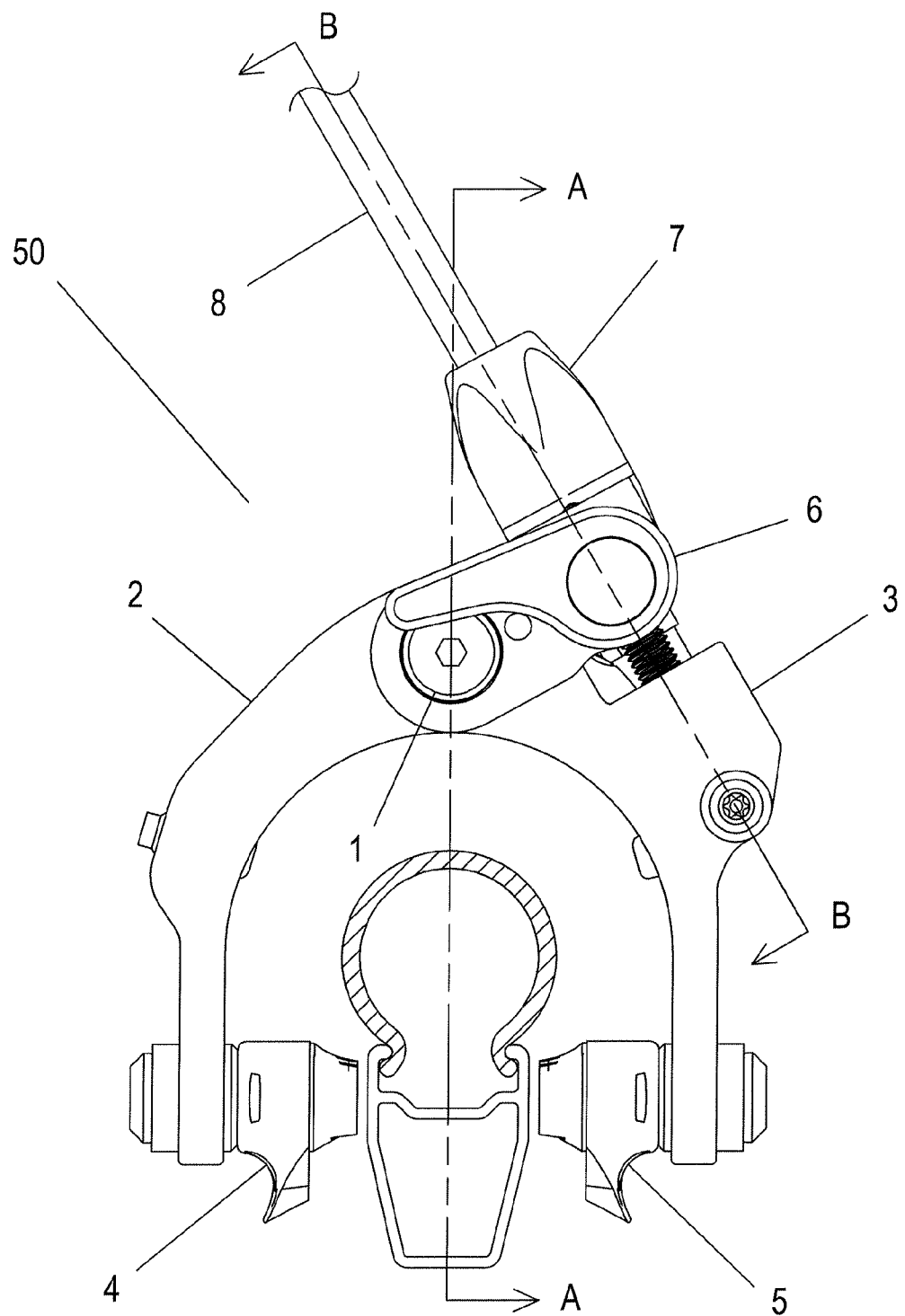
FIG. 1 is a front view of a brake assembly according to an embodiment of the invention.
Figure 5:
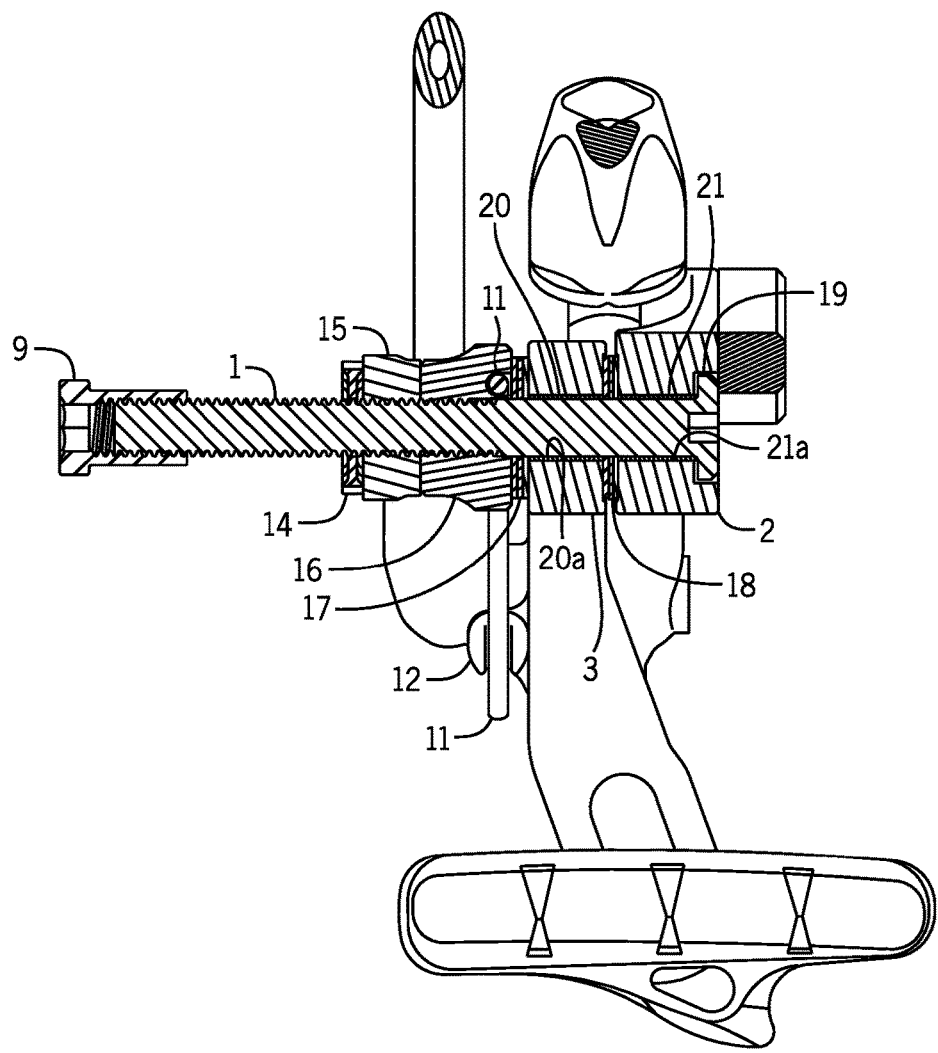
FIG. 5 is a cross-sectional view of section A-A shown in FIG. 1.

Referring to FIGS. 1-6, brake assembly 50 may be constructed as follows. Referring to FIGS. 1 and 5, thrust washer 19 is rotatable relative to pivot bolt 1. Bearing 21 is rotatably received in a hole 21a in first brake arm 2, and is rotatable relative to pivot bolt 1. Thrust washers 18 are rotatable relative to each other and relative to pivot bolt 1. Bearing 20 is rotatably received in a hole 20a in second brake arm 3, and is rotatable relative to pivot bolt 1. Thrust washers 17 are rotatable relative to each other and relative to pivot bolt 1. Nut 16 is threadably engaged with pivot bolt 1, and is axially positioned such that there is little to no axial play between nut 16, thrust washers 17, second brake arm 3, thrust washers 18, first brake arm 2, thrust washer 19, and the head of pivot bolt 1. Jam nut 15 is threadably engaged with pivot bolt 1, and is tightened securely against nut 16. After tightening jam nut 15, nut 16 and pivot bolt 1 are fixed (i.e. non-rotatable) relative to each other. Serrated washer 14 is rotatable relative to pivot bolt 1.

Referring to FIGS. 4 and 5, the middle portion of return spring 11 engages a slot in nut 16. This middle portion of return spring 11 cannot rotate relative to nut 16, and therefore cannot rotate relative to pivot bolt 1 Since pivot bolt 1 is non-rotatable relative to bicycle frame member 10, the middle portion of return spring 11 is also non-rotatable relative to bicycle frame member 10. The two ends of return spring 11 are slidably engaged with spring leg holders 12 and 13, respectively, and spring leg holders 12 and 13 are received in holes in second brake arm 3 and first brake arm 2, respectively, in a manner that is well known in the art. Return spring 11 urges spring leg holder 12 and second brake arm 3 to rotate clockwise around pivot bolt 1 in FIG. 4, and return spring 11 urges spring leg holder 13 and first brake arm 2 to rotate counterclockwise around pivot bolt 1 as shown in FIG. 4.

Figure 6:
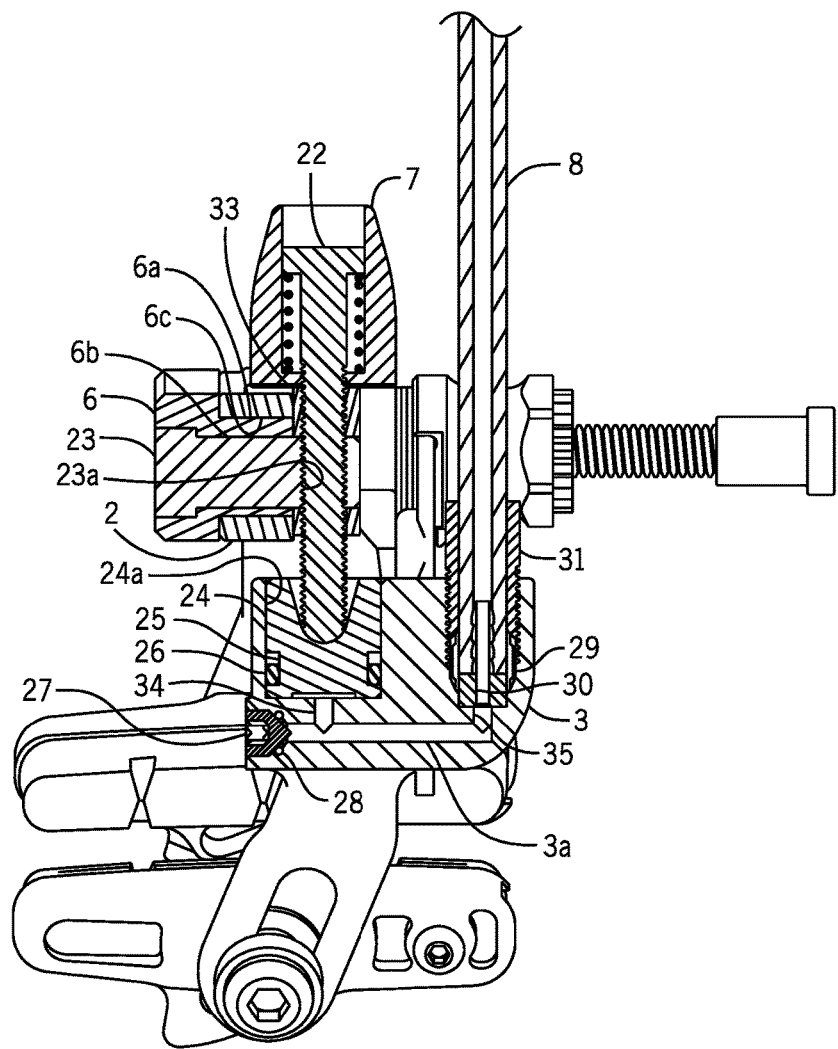
FIG. 6 is a cross-sectional view of section B-B shown in FIG. 1.
Figures 9A, 9B:
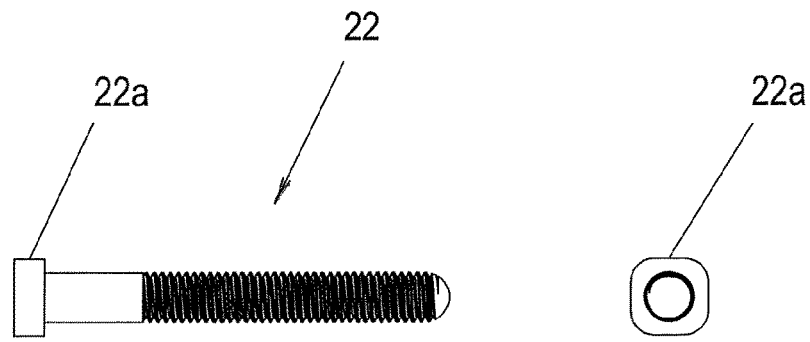
FIG. 9a and FIG. 9b are two views of an adjust bolt of the brake assembly according to the invention.
Figures 10A, 10B:
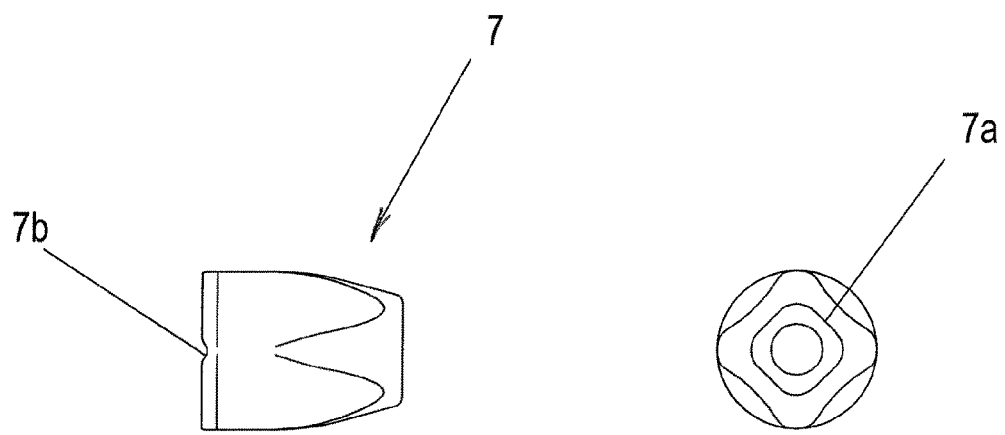
FIG. 10a and FIG. 10b are two views of an adjust knob of the brake assembly according to the invention.
Figure 17:
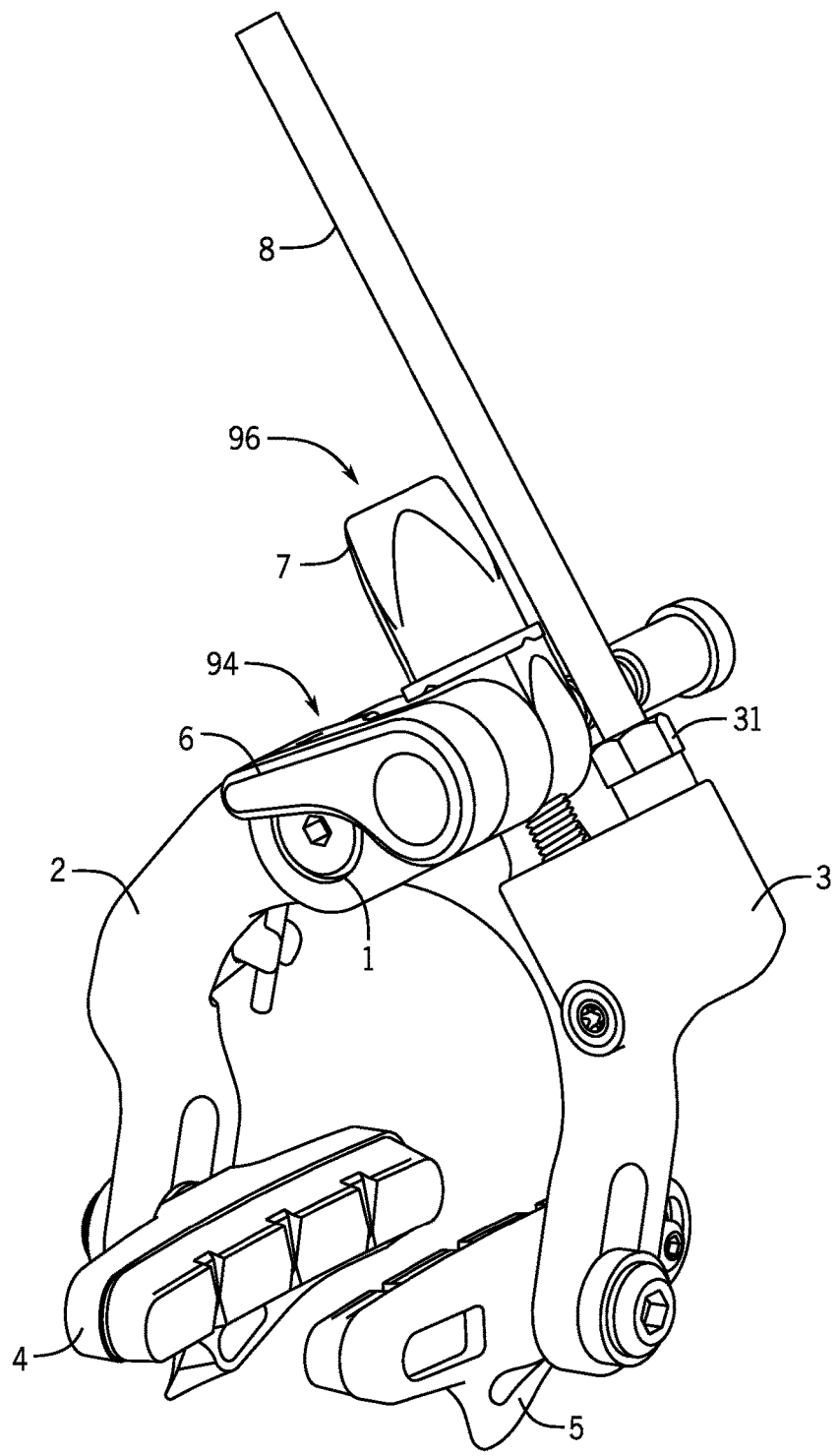
FIG. 17 is an isometric view of the brake assembly of FIG. 1.
Figure 18:
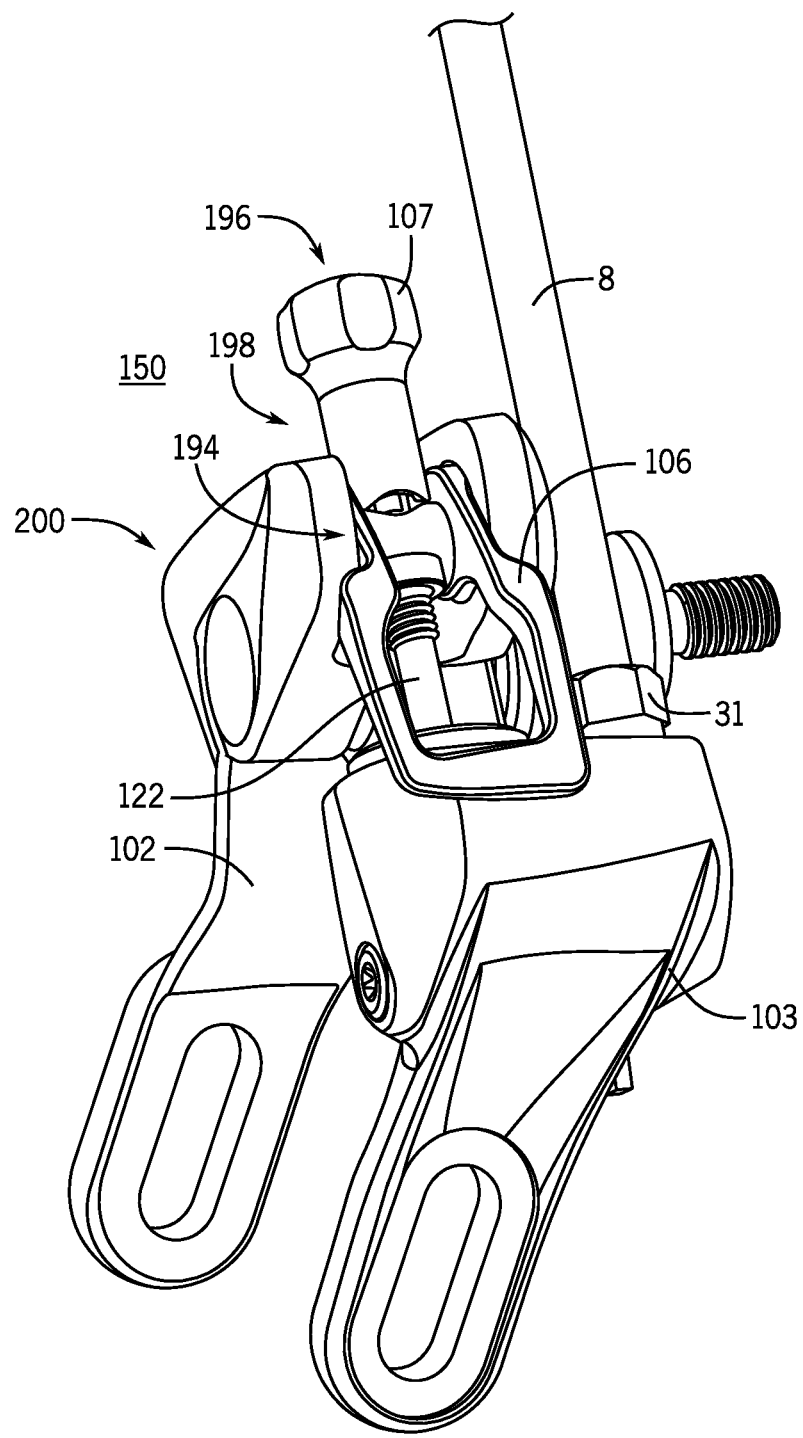
FIG. 18 is an isometric view of a brake assembly according to a second embodiment of the invention.

FIGS. 7a and 7b show a rear view and a side view of quick-release lever 6, which forms part of and actuates a quick-release mechanism 94 (FIG. 17) of the brake assembly 50. Quick-release lever 6 has a cylindrical boss 6a, and a through bore 6b, which will also be referred to as a lever bore, that is not concentric with cylindrical boss 6a. FIG. 6 is a cross-sectional view of section B-B in FIG. 1. Referring to FIG. 6, cylindrical boss 6a of quick-release lever 6 is rotatably received in a hole 6c in first brake arm 2. Receiver 23 is rotatably received in bore 6b of quick-release lever 6. Referring to FIGS. 6, 8a-c and 13, distal end of receiver 23 is rotatably received in through bore or first hole 33a of detent block 33. Adjust bolt 22 is rotatably and slidably received in through hole or second hole 33b of detent block 33 and is threadably engaged with a threaded hole 23a in adjust bolt receiver 23. Adjust bolt 22 will also be referred to herein as a link member, rod or Piston rod.

Referring to FIGS. 9a 9b, 10a 10b, and 13, square head 22a of adjust bolt 22 is slidably and non-rotatably received in square hole 7a of adjust knob 7. Detent spring 32 is received in square hole 7a of adjust knob 7. A first end of detent spring 32 pushes against square head 22a of adjust bolt 22, and a second end of detent spring 32 pushes against the bottom of square hole 7a of adjust knob 7. Thus, detent spring 32 biases adjust knob 7 against detent block 33 in FIG. 13.

Figure 16:
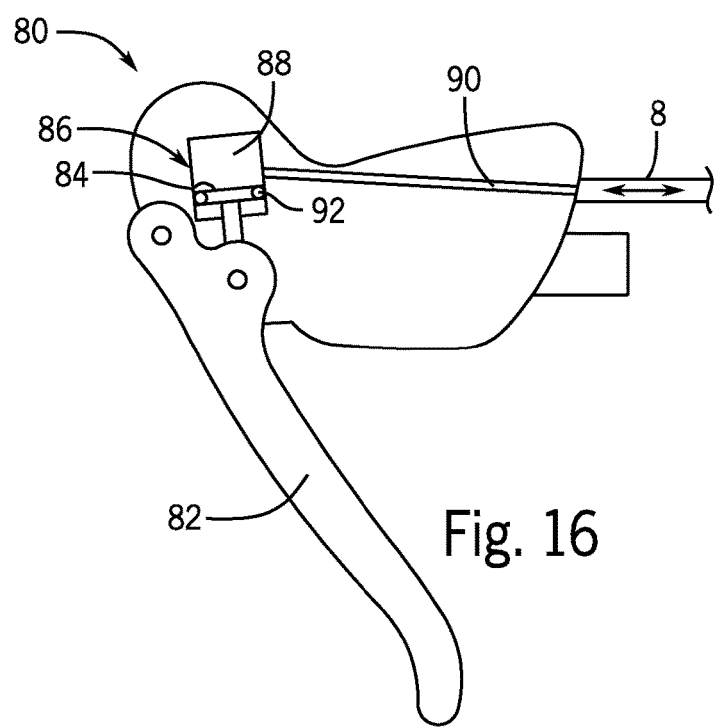
FIG. 16 is a cross sectional view of a brake lever body including a master cylinder assembly for operating the brake assembly of FIG. 1-15.

Referring again to FIG. 6, a first end of a hydraulic brake line 8 is connected to a handlebar mounted actuator 80 (see FIG. 16), and a second end of hydraulic brake line 8 is connected to brake assembly 50 in a manner that is well known in the art and is described as follows. Barbed fitting 30 has a barbed cylindrical portion that is received in the second end of hydraulic brake line 8. One end of a compression ring 29 abuts a tapered section of a bore in second brake arm 3. The top portion of the tapered bore is threaded, and threadably receives a compression nut 31. Hydraulic brake line 8, along with barbed fitting 30, is also received in the bore in second brake arm 3. Compression nut 31 is tightened to a specified torque, deforming compression ring 29 such that compression ring 29, hydraulic brake line 8, and barbed fitting 30 form a leak-proof seal. It will be understood that the connection of the hydraulic line can include any suitable connection.

Figure 11:
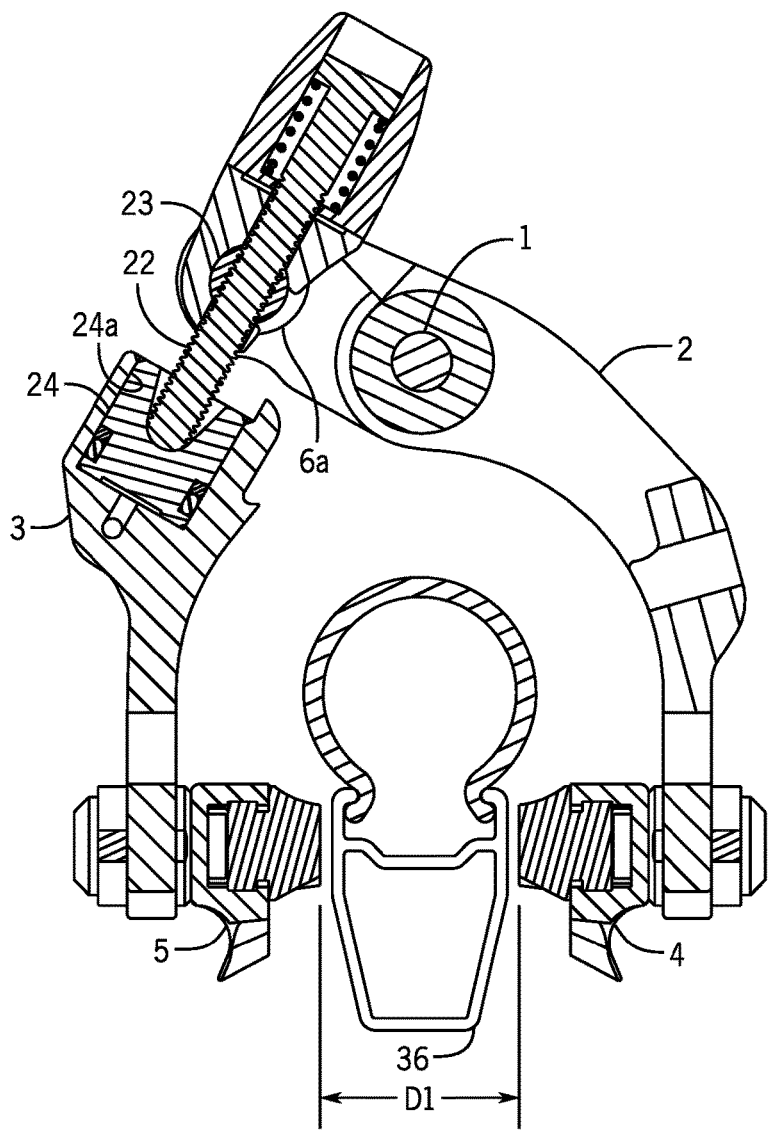
FIG. 11 is a cross sectional view of section C-C shown in FIG. 3

Referring to FIGS. 6 and 11, a piston 24 is received in a piston bore or cylinder 24a formed in second brake arm 3. Piston 24 has a circumferential groove in which is located a seal, which may be in the form of an O-ring 26 and a back-up ring 25. A first end of piston 24 preferably has a tapered bore with a spherically shaped bottom against which is abutted a corresponding spherically shaped end of adjust bolt 22. Referring to FIG. 6, cross-drilled hole 3a of second brake arm 3 runs transversely across the bore that receives piston 24 and the bore that receives hydraulic brake line 8. Connecting holes 34, 35 connect cross-drilled hole 3a to the cylinder 24a that receives piston 24 and the bore that receives hydraulic brake line 8. Thus, hydraulic brake line 8 and the bore 24a that receives piston 24 are in fluid communication with each other. An open end of cross-drilled hole 3a is threaded and receives a small O-ring 28. A bleed screw 27 is threadably received in the open end of cross-drilled hole 3a, and is tightened against O-ring 28 to form a leak-proof seal. In alternative embodiments the piston 24 and cylinder 24a may be disposed separate from the brake arms 2, 3 but configured to operate therebetween.

A cycle of operation of brake assembly 50 is described as follows. FIGS. 4 and 11 show brake assembly 50 in its unactuated state. Referring to FIGS. 4 and 11, return spring 11 urges first brake arm 2 in a counter-clockwise direction around pivot bolt 1, and return spring 11 urges second brake arm 3 in a clockwise direction around pivot bolt 1. But counter-clockwise rotation of first brake arm 2 and clockwise rotation of second brake arm 3 are prevented by the abutment of the bottom of piston 24 with the bottom of the bore 24a in second brake arm 3 that receives piston 24. In other words, first brake arm 2 and second brake arm 3 are sprung against each other by spring 11. However, at the same time it will be understood that the parts of the arms 2, 3 that hold respective brake pad assemblies are biased into an open or apart condition.

Figure 12:
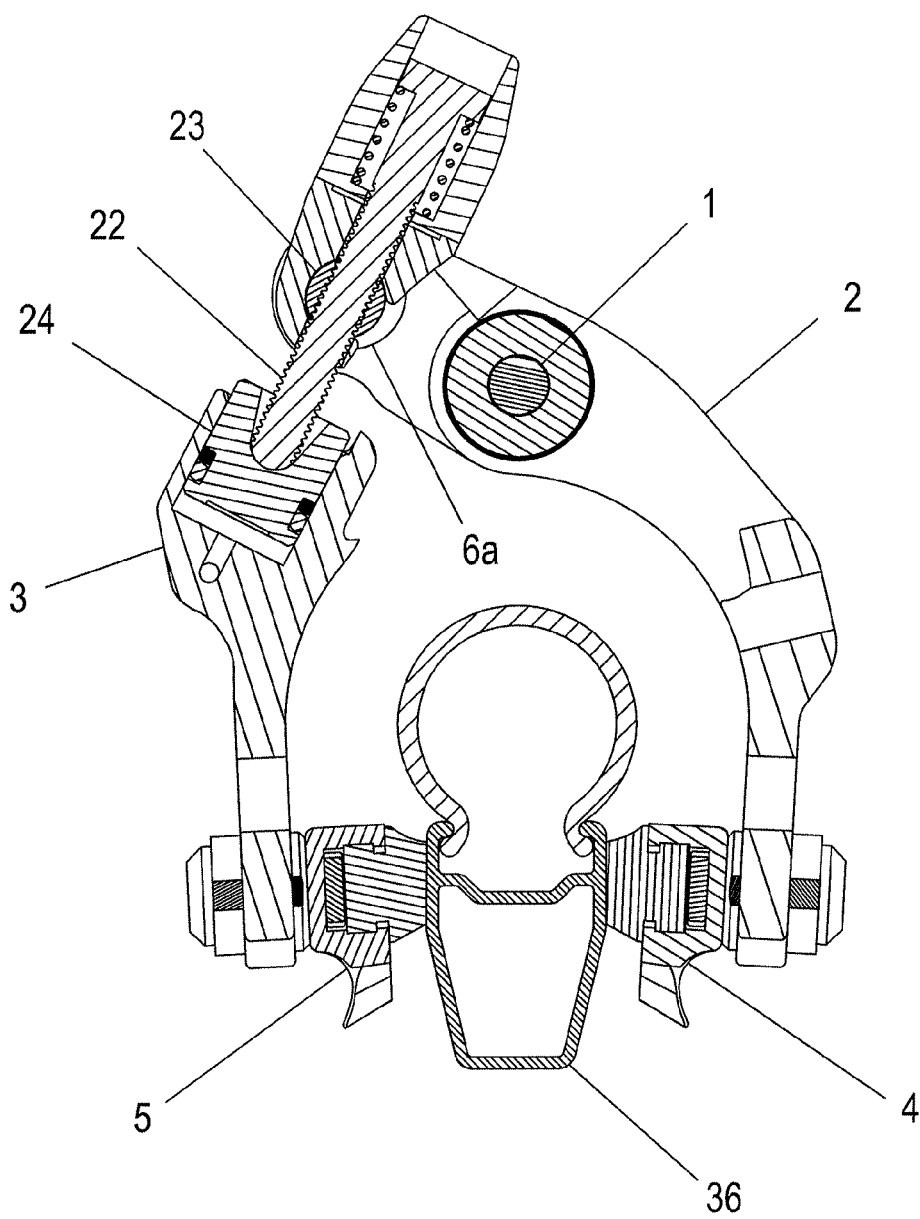
FIGS. 12-15 are cross sectional views of section C-C shown in FIG. 3.

Referring to FIG. 6, hydraulic brake line 8, cross-drilled hole 3a, connecting holes 34, 35 and the handlebar-mounted actuator 80 (FIG. 16) are filled with one continuous volume of any suitable hydraulic fluid. When the handlebar-mounted actuator 80 is actuated by manipulating lever 82, advancing piston 84 within master cylinder 86 displaces a volume of fluid from reservoir 88 through fluid passageway 90 to flow through hydraulic brake line 8, through cross-drilled hole 3a, and upwards into the bore 24a that receives piston 24, pushing piston 24 upwards as shown in FIG. 12. The piston 84 preferably has seals 92. This upwards force on piston 24 causes first brake arm 2 to rotate clockwise (in FIG. 12) around pivot bolt 1 against the urging force of return spring 11, since first brake arm 2 is operatively connected to piston 24. Also, an equal and opposite downwards force causes second brake arm 3 to rotate counterclockwise (in FIG. 12) around pivot bolt 1. First brake arm 2 and second brake arm 3 continue to rotate about pivot bolt 1 until brake pad assemblies 4, 5 contact side walls of a bicycle rim 36, providing a braking force to slow rotational motion of bicycle rim 36. Further clockwise movement of first brake arm 2 and counter-clockwise movement of second brake arm 3 is prevented by the presence of bicycle rim 36. When the handlebar-mounted actuator is released, first brake arm 2 rotates counter-clockwise and second brake arm 3 rotates clockwise due to the urging force of return spring 11, and piston 24 pushes hydraulic fluid out of the bore 24a that receives piston 24 and back towards the handlebar-mounted actuator, until brake assembly 50 is again positioned in the unactuated state shown in FIG. 11.

Figure 13:
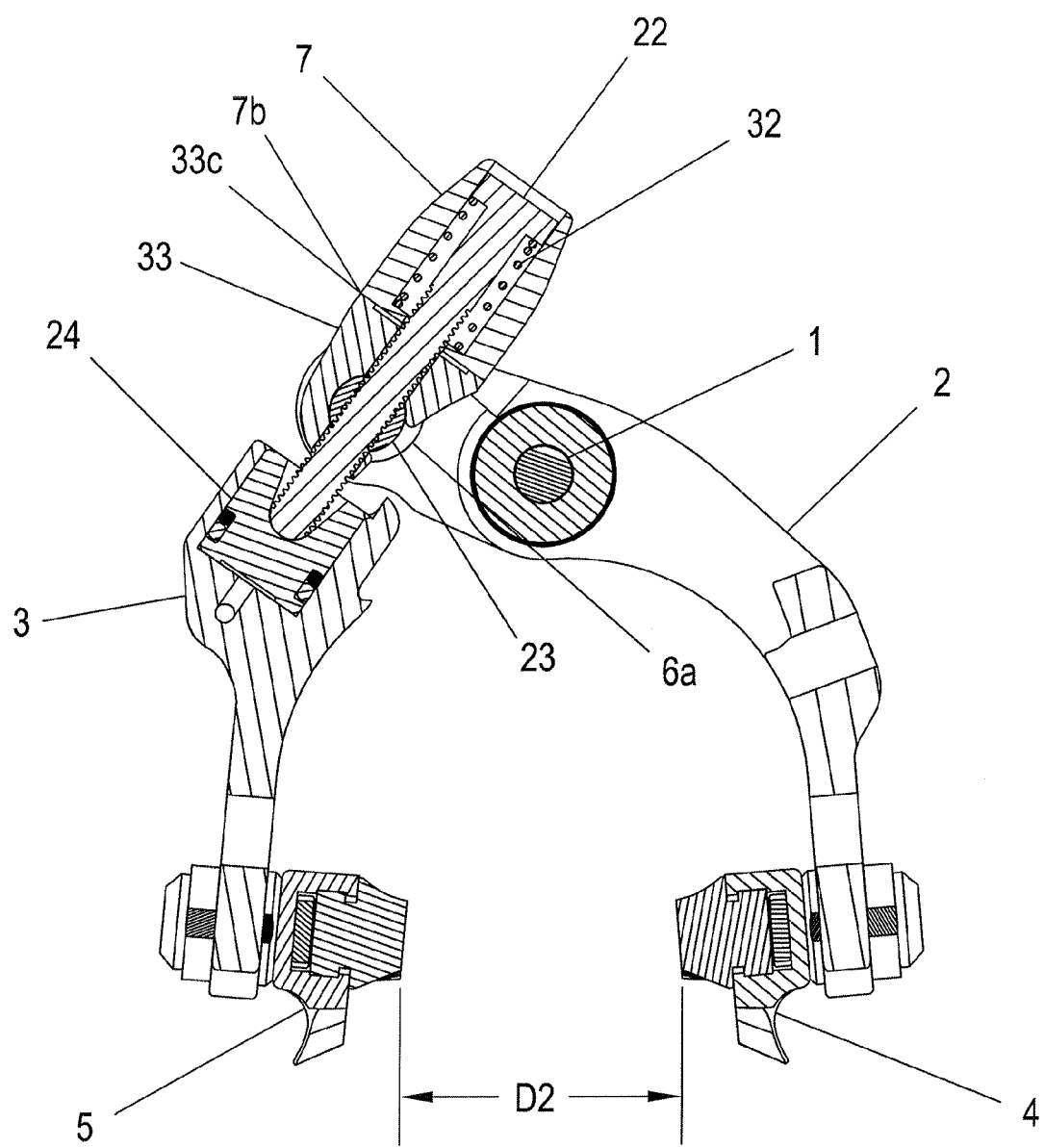

Because rims are available in different widths, and because brake pads wear down over time, it may be necessary to adjust the initial separation between first brake pad assembly 4 and second brake pad assembly 5. The procedure for adjusting brake pad separation is described as follows. Referring to FIG. 11, first brake pad assembly 4 and second brake pad assembly 5 are separated by a distance D1. Referring to FIGS. 8a-c, 10a, 10b, and 13, when adjust knob 7, which forms part of and actuates an adjust mechanism 96 (see also FIG. 17) of the brake assembly 50, is rotated in a first direction, recesses 7b of adjust knob 7 alternately engage and disengage projections 53c of detent block 53 due to the previously described urging force of detent spring 52, producing a detenting action, as used on other mechanisms that are well known in the art. As adjust knob 7 rotates, adjust bolt 22 will rotate with it, since adjust knob 7 and adjust bolt 22 are non-rotatably coupled as previously described. As adjust bolt 22 rotates, its threaded engagement with adjust bolt receiver 23 causes it to move axially relative to adjust bolt receiver 23 and adjust knob 7 as shown in FIG. 13. As, adjust bolt 22 moves relative to adjust bolt receiver 23, first brake arm 2 rotates counterclockwise (in FIG. 13) about pivot bolt 1 and second brake arm 3 rotates clockwise about pivot bolt 1 under the urging force of return spring 11 until first brake pad assembly 4 and second brake pad assembly 5 are separated by a distance D2 that is greater than D1. If, instead of increasing brake pad separation, it is desired to set the brake pad separation to a third distance D3 that is less than D1, adjust knob 7 is simply rotated in a second direction opposite the first direction, causing adjust bolt 22 to move axially in the opposite direction, in turn causing first brake arm 2 to rotate clockwise (in FIG. 13) and causing second brake arm 3 to rotate counter-clockwise against the urging force of return spring 11 until brake pad assemblies 4, 5 are separated by the desired third distance D3 that is less than D1.

Figure 14:
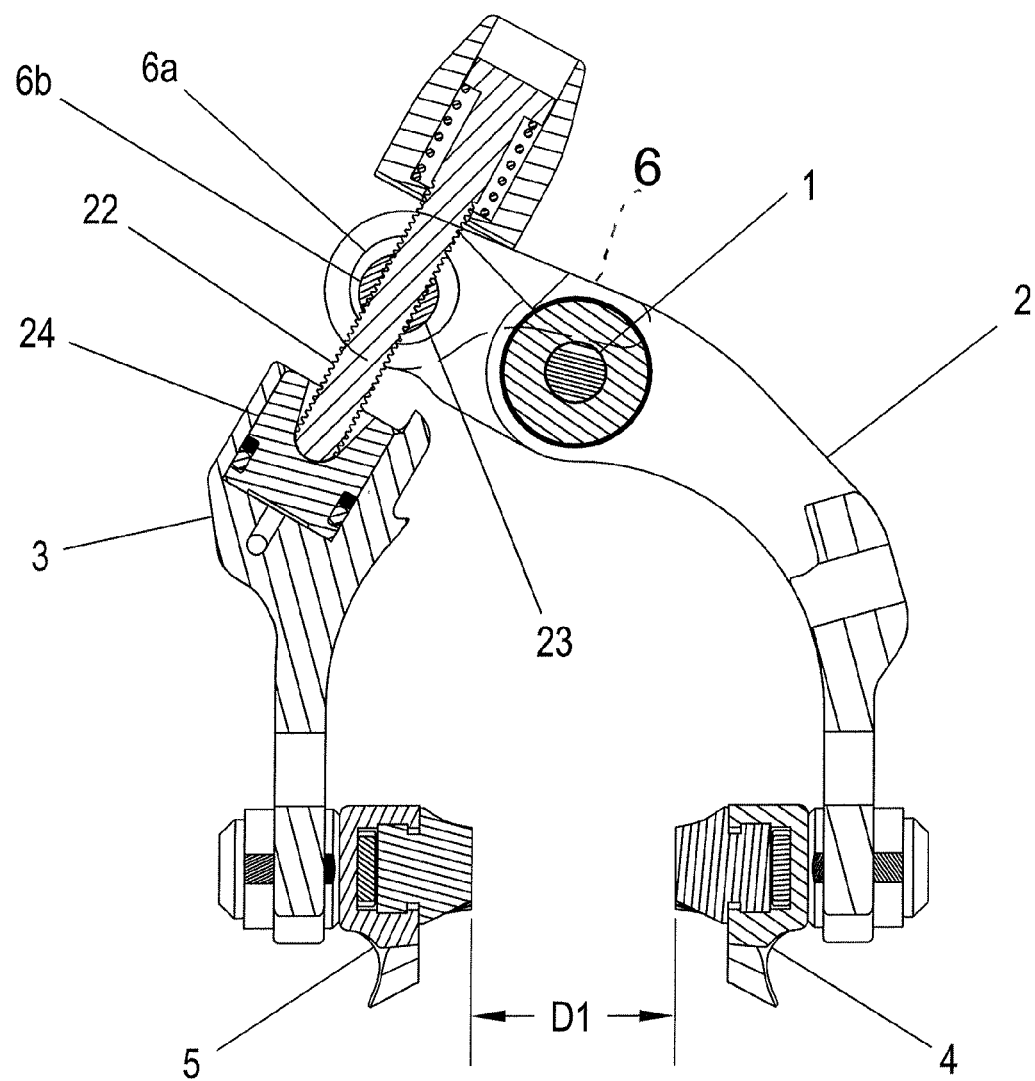
Figure 15:
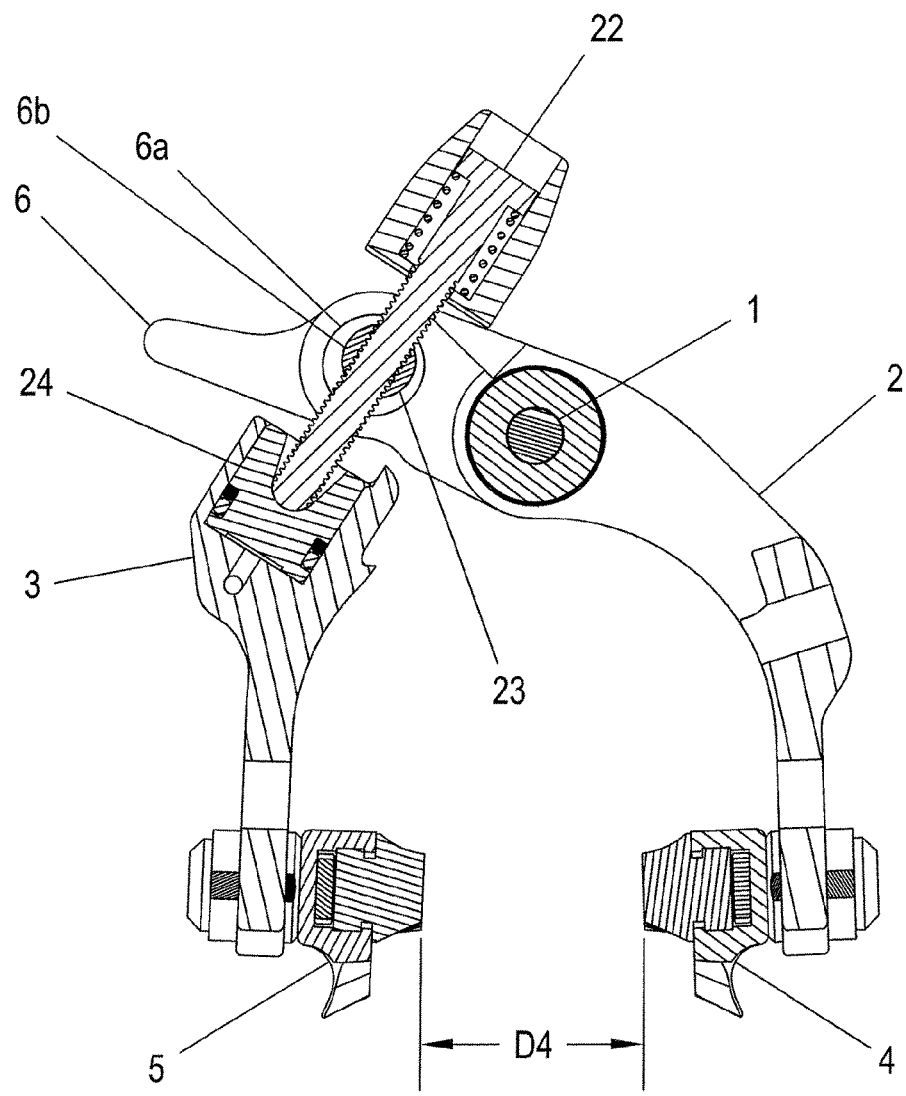

Another feature of a preferred embodiment of the invention is the ability to quickly move brake pad assemblies 4, 5 apart to facilitate wheel removal. This feature is known as "quick-release", and is described as follows, referring to parts of the brake assembly 50 that form the quick-release mechanism 94. In FIGS. 14 and 15, detent block 53 is omitted so that other structure can be seen more clearly. Referring to FIGS. 1 and 14, brake assembly 50 is shown in the same non-actuated state as shown in FIG. 11, with quick-release lever 6 in the closed position. Referring to FIGS. 7a, 7b and 14, bore 6b of quick-release lever 6 and adjust bolt receiver 23 are oriented towards piston 24. When quick-release lever 6 is rotated 180 degrees into the position shown in FIG. 15, bore 6b and adjust bolt receiver 23 are re-oriented away from piston 24 as shown. Since adjust bolt 22 is threaded into adjust bolt receiver 23 and moves with it, adjust bolt 22 moves to a new position relative to first brake arm 2, allowing first brake arm 2 to rotate counter-clockwise (in FIG. 15) about pivot bolt 1 under the urging force of return spring 11, and allowing second brake arm 3 to rotate clockwise (in FIG. 15) about Pivot bolt 1 under the urging force of return spring 11, until brake pad assemblies 4, 5 are separated by a distance D4 that is greater than D1 with the objective of being wider than the bicycle tire. The bicycle tire and wheel can now be more easily removed from the bicycle.

In order to reset the separation of brake pad assemblies 4, 5 back to the original separation distance D1, quick-release lever 6 is simply rotated back to the closed position shown in FIG. 1, which re-orients bore 6b and adjust bolt receiver 23 towards piston 24 as shown in FIG. 14, causing adjust bolt 22 to move relative to first brake arm 2 as shown in FIG. 14, forcing first brake arm 2 to rotate clockwise (in FIG. 14) against the urging force of return spring 11, and forcing second brake arm 3 to rotate counter-clockwise (in FIG. 14) against the urging force of return spring 11, until brake pad assemblies 4, 5 are once again separated by a distance D1.

Figure 11A:
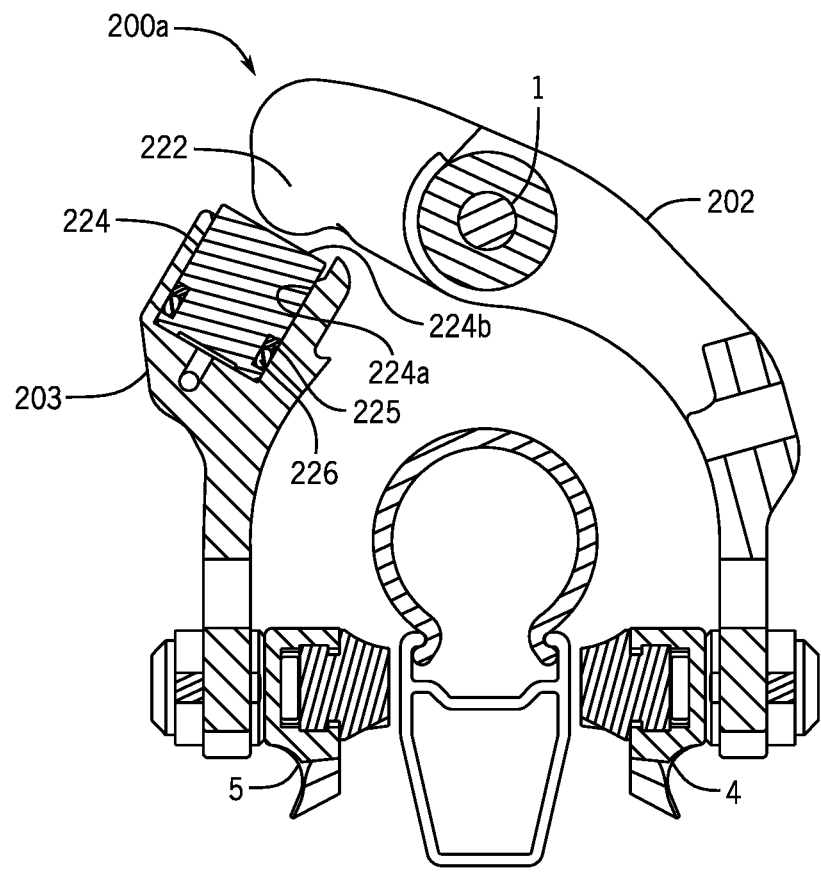
FIG. 11a is a cross sectional view of the brake assembly according to another embodiment of the invention.

FIG. 11a shows a hydraulic brake assembly according to another embodiment of the invention. A first brake arm 202 and brake pad assembly 4 is pivotally connected to a bicycle at pivot element 1. A second brake arm 203 and brake pad assembly 5 is configured to pivot relative to the first brake arm. A piston 224 is received in a piston bore or cylinder 224a formed in second brake arm 203. Piston 224 has a circumferential groove in which is located a seal, which may be in the form of an O-ring 226 and a back-up ring 225. Piston 224 has a bearing end 224b that extends from the cylinder 224a of the second arm 203 in the direction of the upper end 200a of the first arm 202. The first arm 202 includes, at or near the upper end 200a, a surface 222, preferably in the form of a curved surface that is shaped and positioned to contact the bearing end 224b of piston 224.

In use, fluid entering cylinder 224a displaces piston 224 in brake arm 203 in the direction of the upper end 200a of first arm 202. The piston bearing end 224b pushes against surface 222, and thus the upper end 200a, in order to cause the arms 202, 203 to pivot. The pivoting of arms 202, 204 cause the brake pad assemblies 4, 5 to be drawn towards each other when piston 224 is displaced outwardly from cylinder 224a.

FIGS. 18-21 shows yet another embodiment of the invention, wherein most of the components are the same as or are similar to those shown in FIGS. 1-17 and described herein. The brake assembly 150 includes first brake arm 102 and second brake arm 103, both may be pivotally connected to a frame member. Most of the components of a quick-release mechanism 194 and the adjust mechanism 196 are generally positioned at or within a fork arrangement 198 of an upper end 200 of arm 102. Adjust mechanism 196 includes an adjust lever 107 that extends from the adjust mechanism on arm 102. Operation of the adjust lever 107 causes the movement of the link member 122.

Quick-release mechanism 194 includes a quick-release lever 106 that extends from the quick-release mechanism on arm 102. Operation of the quick-release lever 106 also causes movement of the link member 122.

Both quick-release mechanism 194 and adjust mechanism 196 act on link member 122, which acts on piston 124 disposed in arm 103.

Figure 19:
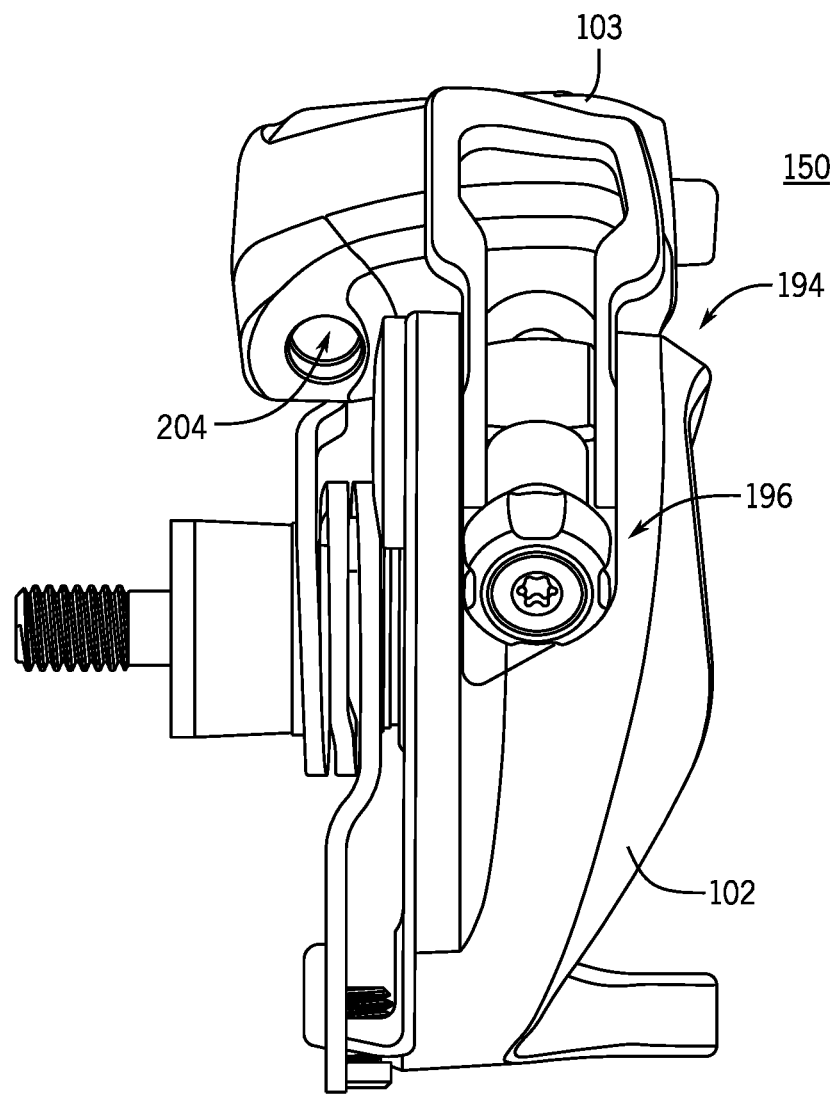
FIG. 19 is a top view of the brake assembly of FIG. 18.
Figure 20:
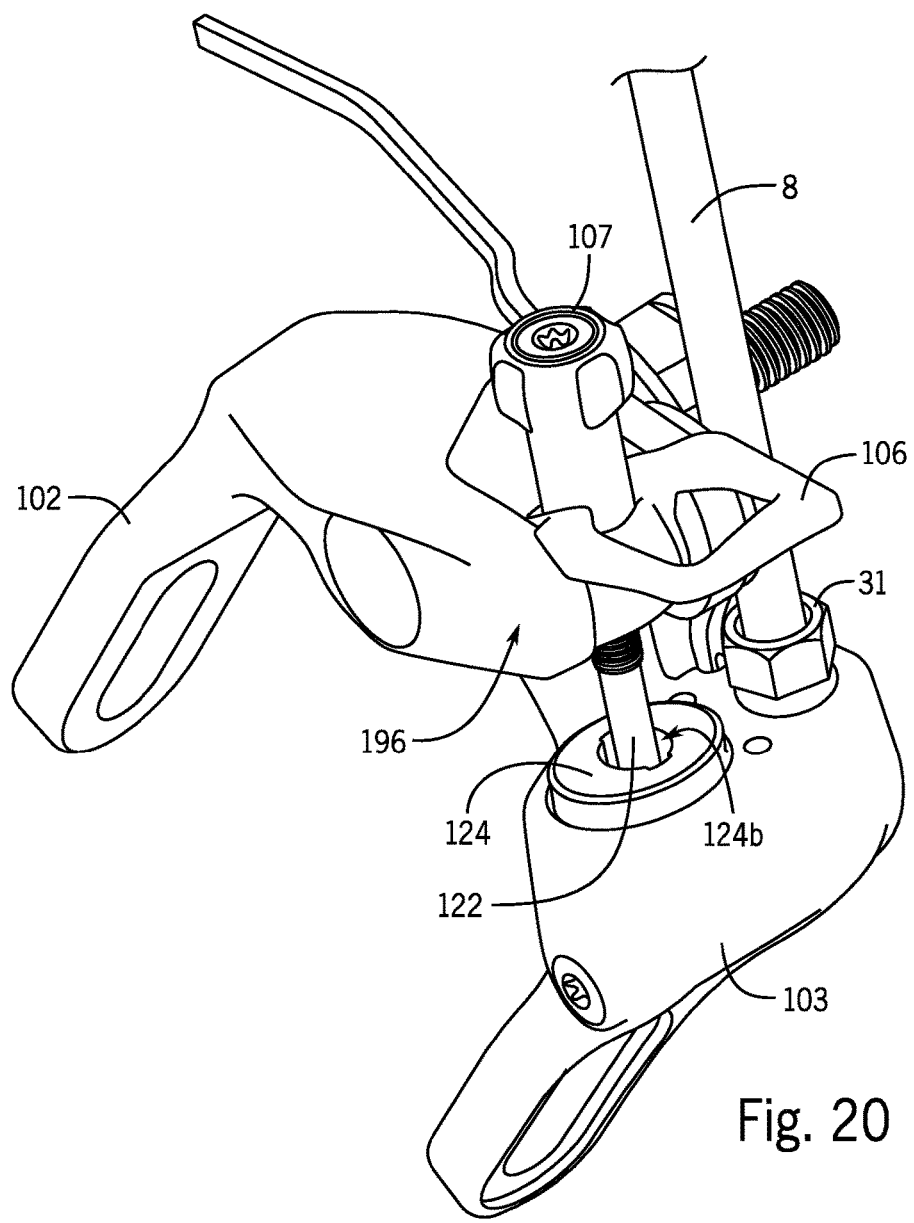
FIG. 20 is an isometric view of the brake assembly of FIG. 18.
Figure 21:
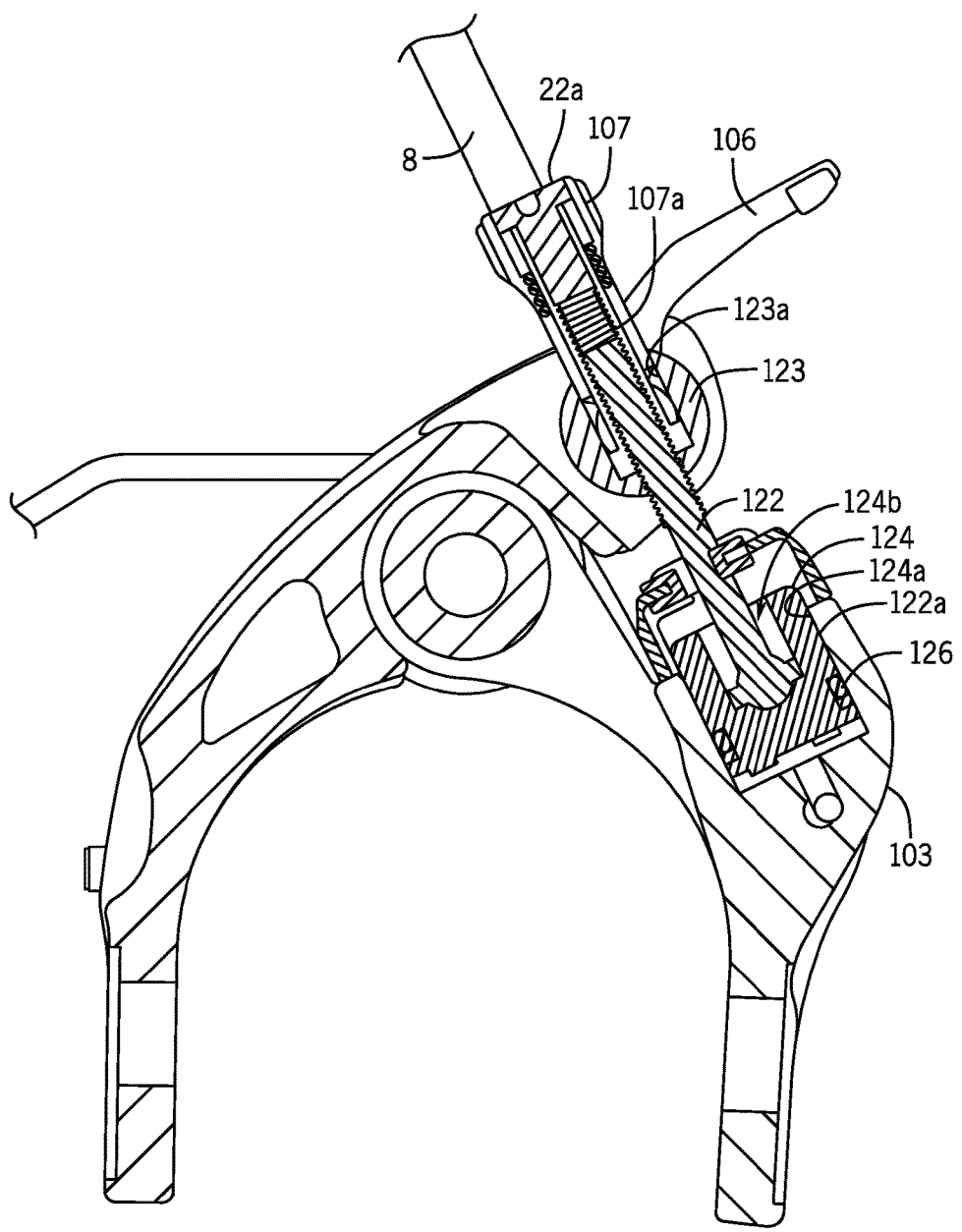
FIG. 21 is a cross sectional view of the brake assembly of FIG. 18.

The hydraulic brake line 8 (FIG. 18) is connected to arm 103 via fitting 31 in the same fashion as in the previous embodiment. FIG. 19 shows the opening 204 in the arm 103, into which the fitting 31 is fitted into the arm and through which hydraulic fluid passes to and from the cylinder 24a formed in the arm.

In the embodiment depicted in FIGS. 18-21 an embodiment of the adjust mechanism 196 is shown in detail. Adjust knob 107 has internal threads 107a that threadably connect the adjust knob to the link member 122. A spring 32 biases the knob 107 and the head 22a apart. Both the adjust knob 107 and the link member 122 pass through receiver 123, although receiver has a smooth walled interior 123a. For adjustment of the adjustment mechanism 196 to occur, when the knob 107 is turned, the link member 122 should be prevented from turning.

Accordingly, there is an arrangement at the end of the link member head 22a that functions to prevent the link member from rotating when the adjust knob 107 is turned. The arrangement includes a piston 124 in cylinder 124a that is prevented by turning, for example, by providing the piston and seal 126 in a non-cylindrical shape, for example an oval shape, which is reciprocally disposed in a matching cylinder 124a (for example a corresponding oval shape). The piston 124 also has a socket 124b that is non-round and an end profile 122a on the link member 122 that non-rotatably fits within the socket. Thus, the piston 124 constrains the link member 122 from turning by virtue of the non-round configuration of the piston and cylinder 124a in combination with the locking socket 124b and end profile 122a.

While this invention has been described by reference to particular embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A hydraulic brake assembly for a bicycle, the bicycle including a master cylinder operated by a brake lever, the hydraulic brake assembly comprising:
   a first brake arm pivotally connected to a frame member of the bicycle on a pivot;
   a second brake arm configured to pivot relative to the first brake arm;
   one of the first and second brake arms including a cylinder, the cylinder non-rotatable relative to the one of the first and second brake arms, the cylinder being in fluid communication with the master cylinder, wherein the cylinder is integrally formed in the one of the first and second brake arms; and
   a piston slidably disposed in the cylinder and configured such that movement of the piston in response to fluid displacement in the hydraulic brake assembly causes the first brake arm and the second brake arm to pivot.

2. The hydraulic brake assembly of claim 1, further comprising a link member configured to be responsive to movements of the piston such that movement of the piston is conveyed by the link member to the other of the first and second brake arms.

3. The hydraulic brake assembly of claim 2, wherein the link member is a portion of the other of the first and second brake arms.

4. The hydraulic brake assembly of claim 2, wherein the link member has a first end in contact with the piston and a second end opposite the first end in contact with the other of the first and the second brake arms, the second end having a head.

5. The hydraulic brake assembly of claim 2, further comprising an adjust mechanism configured to act upon the link member to adjust a spacing between the first and second brake arms.

6. The hydraulic brake assembly of claim 5, wherein the link member has a first end in contact with the piston and a second end opposite the first end in contact with the other of the first and the second brake arms, the second end having a head, and wherein the adjust mechanism includes an adjust knob engaged with and displacing the link member second end to adjust the spacing between the first and second brake arms.

7. The hydraulic brake assembly of claim 6 wherein the adjust knob has an internal configuration shaped to engage the head of the link member.

8. The hydraulic brake assembly of claim 6, further comprising a receiver disposed in the other of the first and second brake arms wherein the link member is engaged with the receiver.

9. The hydraulic brake assembly of claim 8, wherein the link member is threadably engaged with the receiver.

10. The hydraulic brake assembly of claim 9, wherein turning the adjust knob causes the link member to displace the receiver relative to the adjust knob through action of the threaded engagement.

11. The hydraulic brake assembly of claim 10, the adjust mechanism further including a spring positioned between the adjust knob and the head of the link member.

12. The hydraulic brake assembly of claim 11, the adjust mechanism further comprising a detent block having a first through bore through which a cylindrical boss portion of the receiver is positioned and a second hole through which the link member is received, the detent block having one or more projections positioned and shaped to cooperate with corresponding features on the adjust knob.

13. The hydraulic brake assembly of claim 2, further comprising a quick-release mechanism configured to act upon the link member to adjust a spacing between the first and second brake arms.

14. The hydraulic brake assembly of claim 13, wherein the quick-release mechanism includes a quick-release lever positioned on the other of the first and second brake arms, the quick-release lever operatively displacing the link member.

15. The hydraulic brake assembly of claim 14, further comprising a receiver displaceable by the quick-release mechanism, the receiver being disposed in the other of the first and second brake arms wherein the link member is engaged with the receiver.

16. The hydraulic brake assembly of claim 15, wherein the receiver is disposed in a lever bore formed off center through the quick-release lever such that the quick-release lever imparts a cam action to the receiver when the quick-release lever is rotated.

17. The hydraulic brake assembly of claim 1, further comprising a return spring configured to bias the first brake arm and the second brake arm apart.

18. The hydraulic brake assembly of claim 1, wherein the fluid communication between the cylinder and the master cylinder includes a fluid passageway formed in the one of the first and second brake arms.

19. The hydraulic brake assembly of claim 18, wherein the one of the first and second brake arms includes a bleed port formed in communication with the fluid passageway to permit the release of fluid from the fluid passageway.

20. The hydraulic brake assembly of claim 1, further comprising an adjust mechanism and a quick-release mechanism, wherein the other of the first and second brake arms includes an upper end having a fork arrangement and wherein the adjust mechanism and the quick-release mechanism are combined and disposed at the fork arrangement.

21. The hydraulic brake assembly of claim 1, wherein the first and second brake arms are pivotally connected to the frame member of the bicycle on a common pivot.

22. A hydraulic brake assembly for a bicycle, the bicycle including a master cylinder operated by a brake lever, the hydraulic brake assembly comprising:
a first brake arm;
a second brake arm, wherein the first and second brake arms are pivotally connected to a frame member of the bicycle;
one of the first and second brake arms including a cylinder in fluid communication with the master cylinder and non-rotatable relative to the one of the first and second brake arms, wherein the cylinder is integrally formed in one of the first and second brake arms; and
a piston slidably disposed in the cylinder and configured such that movement of the piston in response to fluid displacement in the hydraulic brake assembly causes the first brake arm and the second brake arm to pivot.

23. The hydraulic brake assembly of claim 22, further comprising a quick-release mechanism and an adjust mechanism configured on the other of the first and second brake arms to act between the first and second brake arms to adjust a spacing therebetween.

24. The hydraulic brake assembly of claim 23, wherein the other of the first and second brake arms includes an upper end having a fork arrangement and wherein the adjust mechanism and the quick-release mechanism are disposed at the fork arrangement.

25. The hydraulic brake assembly of claim 23, further comprising a link member that extends between the first and second brake arms and wherein the quick-release mechanism and the adjust mechanism share the link member.

26. The hydraulic brake assembly of claim 25, wherein the quick-release mechanism and the adjust mechanism act upon the link member to adjust the spacing between the first and second brake arms.

27. The hydraulic brake assembly of claim 26, wherein the link member contacts the piston and acts upon the piston to adjust the spacing between the first and second brake arms.

28. The hydraulic brake assembly of claim 22, wherein the first and second brake arms are pivotally connected to the frame member of the bicycle on a common pivot.

29. A hydraulic brake assembly for a bicycle, the bicycle including a master cylinder operated by a brake lever, the hydraulic brake assembly comprising:
a first brake arm;
a second brake arm, wherein the first and second brake arms are pivotally connected to a frame member of the bicycle;
one of the first and second brake arms including a cylinder in fluid communication with the master cylinder and non-rotatable relative to the one of the first and second brake arms, the one of the first and second brake arms including the cylinder being a single-piece; and
a piston slidably disposed in the cylinder and configured such that movement of the piston in response to fluid displacement in the hydraulic brake assembly causes the first brake arm and the second brake arm to pivot.

30. The hydraulic brake assembly of claim 29, wherein the cylinder is formed in one of the first and second brake arms.

31. The hydraulic brake assembly of claim 29, further comprising a quick-release mechanism and an adjust mechanism configured on the other of the first and second brake arms to act between the first and second brake arms to adjust a spacing therebetween.

32. The hydraulic brake assembly of claim 31, further comprising a link member that extends between the first and second brake arms and wherein the quick-release mechanism and the adjust mechanism share the link member.

33. The hydraulic brake assembly of claim 32, wherein the quick-release mechanism and the adjust mechanism act upon the link member to adjust the spacing between the first and second brake arms.

34. The hydraulic brake assembly of claim 32, wherein the link member contacts the piston and acts upon the piston to adjust the spacing between the first and second brake arms.

35. The hydraulic brake assembly of claim 29, further comprising a link member configured to be responsive to movements of the piston such that movement of the piston is conveyed by the link member to the other of the first and second brake arms.

36. The hydraulic brake assembly of claim 35, wherein the link member has a first end in contact with the piston and a second end opposite the first end in contact with the other of the first and the second brake arms, the second end having a head.

37. The hydraulic brake assembly of claim 36, further comprising a return spring configured to bias the first brake arm and the second brake arm apart.

38. The hydraulic brake assembly of claim 29, wherein the first and second brake arms are pivotally connected to the frame member of the bicycle on a common pivot.

* * * * *